(12) United States Patent
Sinitsin et al.

(10) Patent No.: US 8,350,443 B2
(45) Date of Patent: Jan. 8, 2013

(54) METHOD FOR PRODUCING ELECTRIC POWER AND DEVICE FOR CARRYING OUT SAID METHOD

(76) Inventors: Nikolai Ivanovich Sinitsin, Saratov (RU); Vladimir Aleksandrovich Elkin, Saratov (RU); Vladimir Valdimirovich Kislov, Moscow (RU); Oleg Vladimirovich Betsky, Fiyazine (RU); Igor Vladimirovich Taranov, Moscow (RU)

( * ) Notice: Subject to any disclaimer, the term of this patent is extended or adjusted under 35 U.S.C. 154(b) by 730 days.

(21) Appl. No.: 12/087,840

(22) PCT Filed: Jan. 17, 2007

(86) PCT No.: PCT/RU2007/000015
§ 371 (c)(1),
(2), (4) Date: Oct. 13, 2009

(87) PCT Pub. No.: WO2007/084027
PCT Pub. Date: Jul. 26, 2007

(65) Prior Publication Data
US 2010/0219715 A1    Sep. 2, 2010

(30) Foreign Application Priority Data
Jan. 20, 2006 (RU) ............................... 2006101604

(51) Int. Cl.
*H02N 11/00* (2006.01)
(52) U.S. Cl. ........................................ 310/300; 310/366
(58) Field of Classification Search ................. 310/300, 310/363–366
See application file for complete search history.

(56) References Cited

U.S. PATENT DOCUMENTS

| 6,982,501 | B1* | 1/2006 | Kotha et al. ..................... 310/11 |
| 2009/0115293 | A1* | 5/2009 | Wang et al. .................... 310/364 |
| 2009/0216292 | A1* | 8/2009 | Pless et al. ...................... 607/33 |

FOREIGN PATENT DOCUMENTS

| RU | 2080528 | 5/1997 |
| RU | 95122379 | 12/1997 |
| RU | 97112723 | 8/1999 |
| RU | 2168808 | 6/2001 |

* cited by examiner

*Primary Examiner* — Dang Le
(74) *Attorney, Agent, or Firm* — Aleksandr Smushkovich (57) ABSTRACT

The invention encompasses a method for production of electric power from a system of contacts of nanostructured conductive surfaces with a thin water-containing layer, and a hydroelectric generator for carrying out the method. The basis of the invention is a discovery, confirmed by experiments, that the contacts of the conductive surfaces, having nano-dimensional structural and/or parametrical heterogeneities, with the water-containing layer, having a thickness from several nanometers to a fraction of a millimeter, under certain conditions, described in the present disclosure, generate electromotive force in an external electrical load. The invention utilizes new principles for building power systems, which can find further wide application in various areas of science and technology.

17 Claims, 3 Drawing Sheets

METHOD FOR PRODUCING ELECTRIC POWER AND DEVICE FOR CARRYING OUT SAID METHOD

CROSS-REFERENCE TO RELATED APPLICATIONS

This application is a U.S. national phase application of a PCT application PCT/RU2007/000015 filed on 17 Jan. 2007, published as WO2007/084027, whose disclosure is incorporated herein in its entirety by reference, which PCT application claims priority of a Russian patent application RU2006/101604 filed on 20 Jan. 2006.

FIELD OF THE INVENTION

The claimed invention relates to methods and devices for production of electric power by using renewable energy sources, and includes a method for production of electric power from a system of contacts of nanostructured conductive surfaces provided with a thin water layer, and a hydroelectric generator capable to serve as an electric power source, built on the basis of the aforesaid system. The claimed invention utilizes new principles for designing power systems, which can find further wide application in various areas of science and technology.

BACKGROUND AND BRIEF DESCRIPTION OF THE INVENTION

The underlying physical basis of the invention is that a system of contacts of predetermined nanostructured conductive surfaces with a predeterminedly thin water-containing layer under certain conditions becomes a source of electromotive force (EMF). To create these conditions, it is necessary, first, that the water-containing layer from two opposite sides be surrounded by layers of conductive material. In order to avoid the possibility of change of the chemical composition of water, the conductive layers should be produced of material, inert in relation to water (metals, metalloids, their salts, alloys, semiconductors). Secondly, the surfaces of conductive layers contacting with the water-contacting layer, should be nanostructured, i.e. should have 'nano-dimensional' structural heterogeneities (i.e. structural heterogeneities with dimensions limited in a predetermined nano-meters range) in the form of ledges and/or hollows and/or nano-dimensional parametrical heterogeneities (heterogeneity of conductivity, dielectric permeability, etc.).

The contact system, comprising the first conductive layer, the water-containing layer, and the second conductive layer, is characterized in that a difference of electric potentials is developed between the conductive layers. The development of the potential difference is caused by the process of structuring the aquatic environment, which is initiated by non-uniform electric field existing near nano-dimensional structural and/or parametrical irregularities (heterogeneities) of the conductive surfaces, contacting with water molecules. In general, the number of such conductive layers can be arbitrary, but at least two.

Thus, near the spots of the nanostructured conductive surfaces contacting with a thin water layer, conditions for structuring the aquatic environment are created, which structuring, in turn, leads to dividing and carrying over oppositely charged components of the aquatic environment onto the opposite conductive surfaces of plates disposed in such a way that surrounding the water-containing layer.

This effect was first discovered experimentally by the authors of the claimed invention and can be conditionally designated as 'hydroelectric'. If an electric load is connected to the system of conductive layers, electric current, will flow in this load and will lead to releasing electric power. Apparently, the electric current will flow until the mentioned dividing and carrying over take place, i.e. until the nano-dimensional structural and/or parametrical heterogeneities of the conductive surfaces exist.

Thus, the system of contacts of the nanostructured conductive surfaces with a thin water layer with a thickness from a single-digit number of nanometers and more under the above-described conditions becomes a source of EMF, from which it is possible to produce electric power.

It is ascertained, that an insignificant hydroelectric effect takes place even in the case when a thin layer of pure water is enclosed between surfaces of the conductive layers, which layers don't practically include substantially expressed heterogeneities, for example, due to extremely thorough processing of these surfaces. The specified phenomenon is essentially caused by the presence of both structural, and parametrical nano-heterogeneities on such surfaces, which promote a weak, vanishingly tiny structuring the thin water layer.

The plates limiting the layer of water can be made not only of conductive material, but also of dielectric or semiconductor material. In this case, for achievement of the hydroelectric effect, it is enough if their surfaces, contacting with the water-containing layer (one or both), have conductive inclusions—parametrical heterogeneities. In turn, the surfaces of the specified conductive inclusions contacting with the water-containing layer, should be nano-dimensional and/or have nano-dimensional heterogeneities. Additionally, for production of electric power, the specified conductive inclusions in each layer should have electric contact with the corresponding contacts to which the electrical load is connected.

The required structural and/or parametrical heterogeneities have been produced by special processing of the surface of the conductive layers contacting with the water-containing layer, and/or by an artificial coating, by placing a predetermined material, on the surface of the conductive layers or conductive inclusions. Carbon nano-tubes, diamond powder, etc. can be utilized as the predetermined material for the coating on the surfaces of the conductive layers or on the conductive inclusions.

DESCRIPTION OF THE DRAWINGS

The invention is illustrated by the following drawings.

Figure 1:
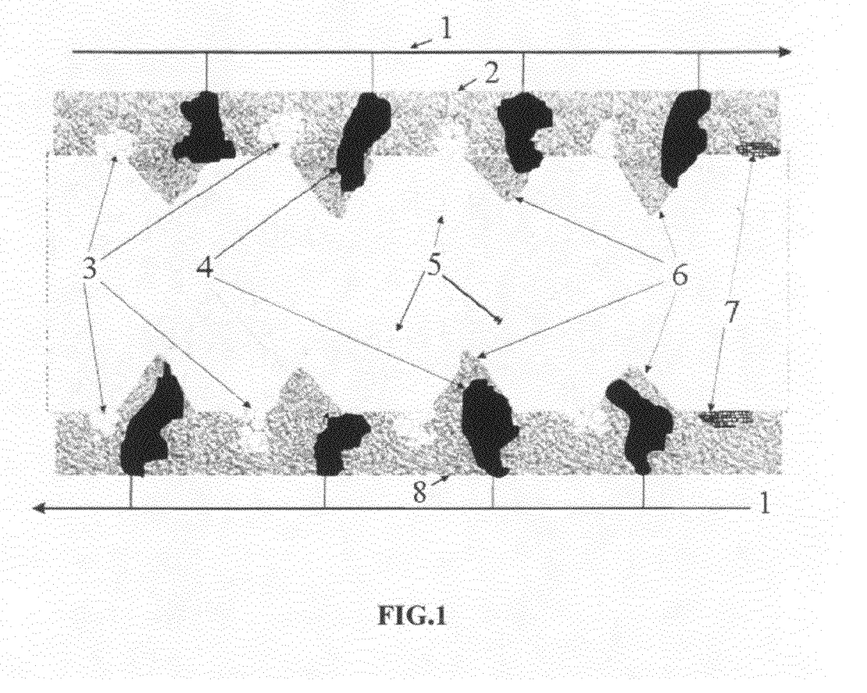
FIG. 1 shows a general view of a water-containing layer limited by plates with non-uniform conductive inclusions on the plates' surface being in contact with the water-containing layer, according to the present invention.
Figure 2:
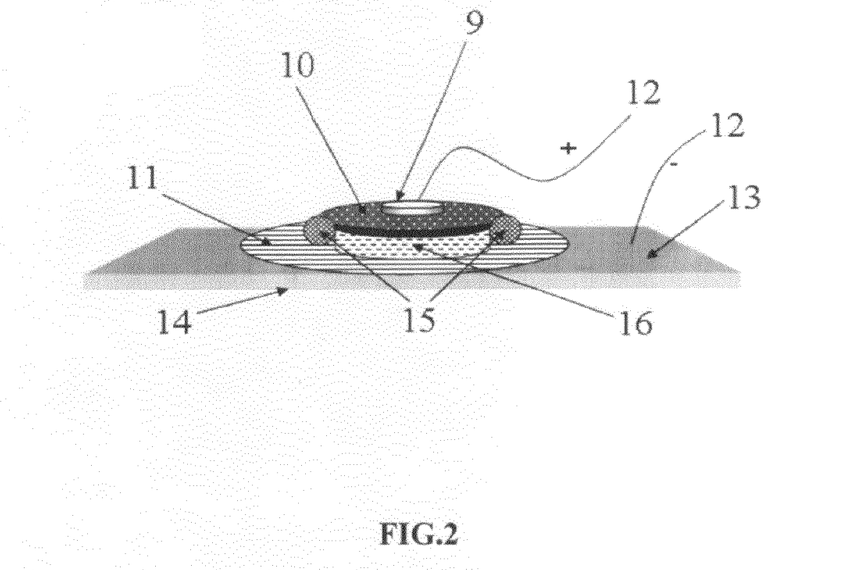
FIG. 2 shows a general view of a usual unscreened water-containing cell (membrane), according to the present invention.
Figure 3:
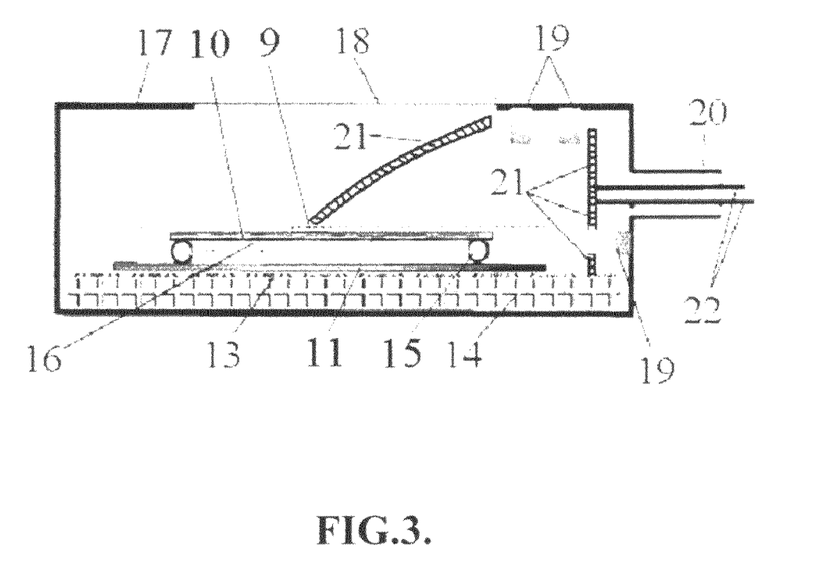
FIG. 3 shows a screened hydroelectric cell (membrane), according to the present invention.

Special reference numerals are designated to the following elements illustrated on FIGS. 1,2,3:

1—electric connections to a common electric bus (electrical load);
2—a first plate;
3—hollows
4—conductive inclusions connectable to the electric bus;
5—a water-containing layer;
6—ledges 7—parametrical heterogeneities;
8—a second plate;
9—a contact plate made of copper foil;
10—a top electrode with micro- and nano-structured non-uniform surface;
11—a bottom electrode made of more uniformed or a similar material;
12—thin insulated copper wires;
13—silver coating;
14—a plate of policore;
15—fiberglass supports;
16—a water layer, or a water-containing layer with different inclusions;
17—a metal case;
18—a metal cover
19—feed-through capacitors;
20—a screen copper tube;
21—inductive chokes made of thin electric cable;
22—a double-wire line.

DESCRIPTION OF A PREFERRED EMBODIMENT OF THE PRESENT INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

A general view of several basic elements of the inventive contact system, allowing to achieve the hydroelectric effect, is displayed on FIG. 1. The system comprises a cell including the water-containing layer 5, which is limited by the plates 2, made of inert in relation to water conductive material, whose surface contacts with the water-containing layer 5 and has nano-dimensional structural 3 and 6, and/or parametrical heterogeneities 7. In some embodiments the plates 2 are made of dielectric or semiconductor, they should contain nano-dimensional conductive inclusions 4, which should be connected to the corresponding electric contacts (the common electric bus 1).

During the carrying out of experiments, which have enabled achieving the hydroelectric effect, on certain devices, made according to the present invention, the plates 2 surrounding the water containing layer 5 have been made of materials, inert in relation to water, e.g. carbon, silicon, glass carbon, vanadium dioxide, gold, chrome, and some other materials containing nano-dimensional heterogeneities in the form of ledges 6 or hollows 3, or parametrical heterogeneities 7, on the surface of the plates 2, contacting with the water-containing layer 5.

In the majority of the experiments carried out, water bi-distillate with a thickness of about 100 micron was used to form the water containing layer 5, and the area of contact of the conductive layer with water was about 1 cm². In an external electrical load of such cells, electric currents have been achieved ranged from single-digits of nano-ampere to single-digits of micro-ampere, produced at voltage of about 10-300 milli-volt.

It is ascertained, that nano-dimensional heterogeneities in the form of ledges or hollows or parametrical heterogeneities on the conductive surface of the plates contacting with the water-containing layer, can be made of a material nonconductive and insoluble in water. In this case, the structuring of the water layer 5 by dielectric nano-dimensional structural heterogeneities, leading to the hydroelectric effect, also takes place. However, the probability of occurrence of non-uniformed electric fields in the homogeneous aquatic environment, leading to the structuring of the water layer, proves to be essentially less, than in the presence of conductive nano-dimensional structural heterogeneities. Therefore, the intenseness of effect of electric power generation by the water-containing layer considerably decreases. The examples of such nonconductive nano-structured and micro-structured heterogeneities, used in the experiment, were diamond powders, powders of pounded glass, corundum powders, powders of coral calcium "Alka-Main", which were uniformly distributed on the surface of one of the layers.

It is experimentally ascertained, that the discovered phenomenon of generation of electric power takes place in cases when the layer of water contains chemical and/or mechanical impurities, including water-soluble salts. The effect does not qualitatively change at concentrations of impurities up to 1%.

It is also experimentally ascertained, that the amounts of produced EMF and internal resistance of the water layer depend on the material of which the plates contacting with water are made, and also on the character of heterogeneities, taking place on their surfaces, and can differ by a magnitude of two-four orders.

It is also ascertained, that with an increase of the thickness of the water layer, which is in contact with the same materials, from several nanometers to 50 microns (i.e. a fraction of a millimeter), the voltage (the amount of produced EMF) and the electric current decrease.

During the carrying out of researches, a hundred-percent repeatability of the experimental results was observed at preservation of the conditions of experiments.

Temperature limits for existence of the effect are determined by the conditions for existence of the liquid phase of water.

There have been developed and tested embodiments of the inventive devices each representing a source of electric power, comprising a layer of pure water, enclosed between the plates made of conductive and inert in relation to water materials, including nano-dimensional heterogeneities on their surface contacting with the layer of water. At an output voltage from 7-15 mV up to 500 mV, they have provided an electric current from 5-10 nA up to 6000 nA in the electric load. The given results are obtained in the temperature range of 12-30° C. in the layers of bi-distilled water with a thickness not more than 100-300 microns, and having an area of the working surface from 1 to 2 cm². In the experiments, the following insoluble in water materials have been used: polished mono-crystal silicon, mono-crystal silicon with micro-rough surface, mono-crystal porous silicon with nano-pores, polished glass carbon and glass carbon with micro-heterogeneities, carbon nano-tubes, and dioxide vanadium nano-structures.

A usual (unscreened) water-containing membrane (cell) is presented on FIG. 2. The bottom electrode 11 of the membrane is connected to an external electric circuit through a piece of copper wire 12 made of EMRW-0.05 (enameled moisture-resistant wire), whose ends are soldered on tinned patches. The top electrode 10, limiting the water-containing layer 16, is designed as a thin electro-conductive plate made of material with nano-heterogeneities. The top electrode 10 is separated from the bottom electrode 11 by the support 15 made of fiberglass thread. The top electrode 10 contacts with the plate 9 of copper foil having an electric connection of the diffusing-compressive type with the piece of copper wire 12 EMRW-0.05, through which it is connected to the external electric circuit. The bottom electrode 11 is connected to the external circuit in a similar way.

A screened hydroelectric cell (membrane), illustrated on FIG. 3, comprises the metal case 17, made in the form of a whole-metal hermetic container of a cylindrical shape soldered for the period of carrying out of the experiment with the metal cover 18 made of sheet brass with a thickness of 0.3 mm, and has a piece of thin copper tube 20 (with an internal diameter of 3.0 mm), through which copper tube the double-wire line 22 is passed, intended for connection to a measuring installation.

For measurement of currents and voltage of small quantities of nano- and micro-orders, a high degree of noise immunity (i.e. interference protection) is required, and that has necessitated application of whole-metal screen constructions in the experiment. As illustrated on FIG. 3, there is disposed the water-containing membrane (shown in detail on FIG. 2), which is fixed on the surface of the plate 14 made of solid dielectric, for example policore, with metalized (i.e. covered by a metal coating 13, shown on FIGS. 2 and 3) top and bottom surfaces, electrically connected to each other and to the whole-metal case 17 of the cell. The contact of the top electrode plate 10 of the membrane with the plate 9 of copper foil, laying on it, is galvanic. In turn the surface of the bottom electrode plate 11 of the membrane is fixed on the top surface of the metalized policore plate 14. The membrane is connected to the input of the screened double-wire line 22 through the chokes 21 and the feed-through capacitors 19, forming a filter of low frequency. The bottom 11 and top 10 flat electrodes of the membrane contacting with water, had a deviation from parallelism regarding each other, not exceeding 0.1-0.3 microns on 2 $cm^2$. The distance between the electrodes 10 and 11 was maintained by means of the fiber glass thread support 15 of a predetermined calibrated diameter (FIG. 3).

The screened hydroelectric cell (illustrated on FIG. 3) operates as an electric generator in the following way. The water-containing membrane shown on FIG. 2, located inside the whole-metal case 17 of the screened water electric cell (FIG. 3) generates voltage, which voltage, through the chokes 21 and the feed-through capacitors 19, is applied to the input of the double-wire screened line 22. If an electric load is connected to the exit of the line 22, then electric current will start flowing through the line.

The experiments showed that the electric parameters of the screened hydroelectric cells remain practically invariable for a long time (up to tens of hours). Changes in electric parameters of the cells began practically at evaporation of the appreciable quantity of water from the water containing membrane. The authors did not take any special constructive measures for hermetatizatioin of the cells to prevent the evaporation of water from them during operation. There exist well-known technologies that allow making hermetic devices, which enclose water-containing layers, similar to the above described. Such technologies exclude evaporation and leak of water therefrom. However, hermetization is not a subject of the present invention.

The cell operates as a generator of electricity in the following way. The hydro-containing cell generates voltage, which through the chokes and the feed-through capacitors is applied to the input of the double-wire screened line 22. If the electric load is connected to the line's exit, then the electric current will start flowing through it. Several hydro-containing cells can be connected to each other in parallel or in series, thereby joined in one electric circuit. In the first case it leads to an increase of the operating current, in the second case, it leads to an increase of the operating voltage.

For manufacturing of boundary electrodes of the hydro-containing membranes, the following materials were used:

- the plates of mono-crystal silicon with intrinsic conductivity and degree of purity of 999, 999999% with the surface, polished by the 14th class;
- the plates of silicon covered with carbon nano-tubes with a diameter from 30 to 250 angstrom, grown up in the form of thin films with a thickness of 0.1-0.2 micron;
- the plates of nano-porous silicon of the same degree of purity of n-type and p-type;
- the polished plates of glass carbon;
- the plates of glass carbon with nano-dimensional heterogeneities of the surface;
- the plates of glass carbon with nano-pointed heterogeneities, covered with the thin film of carbon nano-tubes;
- the plates of silicon covered with the thin film of dioxide vanadium nano-structures with the sizes of nano-grains of 100-120 nanometers in height and 80-100 nanometers in width, located closely to each other on the substrate surface;
- the polished chrome plates; the nano-rough chrome plates;
- the polished and nano-rough gold plates; the polished and nano-rough tantalum plates.

For preparation of the hydro-containing cells the following materials were used: water bi-distillate; diamond powders No 5, No 14, No 28; corundum powders No 10, No 28, No 40; powder of coral calcium Alka-Main of the natural origin; powder of coral calcium Alka-Main of the artificial origin; glass dust (pounded glass with the sizes of particles of 5-10 microns).

The results of the experiments have shown, that introduction of soluble impurities (acids, spirits, physiologic saline) in pure water even in extremely small concentration (not exceeding 1%), yet not causing a noticeable increase in conductivity of water (less than 10%) and not causing an occurrence of concentration cells, leads to an increase of the hydroelectric effect by several times.

It should be emphasized, that with the purpose of providing the water layers purity, reproducibility of the results of the experiment and increasing the measurements accuracy in all carried out experiments, completely monolithic conductive layers were used for producing the plates enclosing the thin water-containing layer. And only such layers, whose surfaces were contacting with the water layer, had, in turn, nano-dimensional structural or parametrical heterogeneities. It is especially important that in this case any difficult-to-accomplish integration of conductive inclusions on the surface of the layers, enclosing the water-containing layer therebetween, into a common electric bus is unnecessary, since the use of the monolithic conductive layer automatically solves this problem, providing the required nano-dimensional structural or parametrical heterogeneities.

Results of the experimental researches of the sources of electricity based on the system of contacts of nanostructured conductive surfaces with a thin water layer.

The results of the experiments are given in tables 1-7 below.

In the tables, S is the plate's area. In the tables' column "Time" the last figure corresponds to the termination of changes of the current and voltage.

TABLE 1

Operating currents and voltage of the screened cells of the water-containing membranes with electrodes of mono-crystal polished silicon and nano-porous silicon.

| No | Bottom electrode | Top electrode | Filler. Layer's thickness, h, micron | Time, s | $U_{output}$, mV | $I_{output}$, nA |
|---|---|---|---|---|---|---|
| 1 | Mono-crystal polished silicon S = 18 cm². Sample No 7, fragment-1 | Nano-porous silicon, S = 2 cm². Sample No 1, | Water h = 200 | 2<br>5<br>15<br>35<br>120<br>600 | 70<br>50<br>40<br>35<br>30<br>30 | 135<br>94<br>66<br>44<br>32<br>30 |
| 2 | Mono-crystal polished silicon S = 18 cm². Sample No 7, fragment-1. | Mono-crystal polished silicon S = 4 cm². Sample No 7, fragment-2. | Water h = 150 | 2<br>5<br>15<br>35<br>700 | 3<br>0<br>0<br>0<br>0 | 1<br>0<br>0<br>0<br>0 |

TABLE 2

Operating currents and voltage of the screened cells of the water containing membranes with electrodes of mono-crystal polished silicon covered with a thin film of carbon nano-tubes.

| No | Bottom electrode | Top electrode | Filler. Layer's thickness, h, micron | Time, s | $U_{output}$, mV | $I_{output}$, nA |
|---|---|---|---|---|---|---|
| 3 | Mono-crystal polished silicon S = 18 cm². Sample No 7, fragment-1. | Silicon with carbon nano-tube operating surface S = 1 cm². Sample No 1 (1014). | Water h = 300 | 2<br>5<br>10<br>20<br>900<br>1800 | 54<br>48<br>44<br>40<br>30<br>23 | 320<br>250<br>200<br>187<br>150<br>100 |
| 4 | Mono-crystal polished silicon S = 18 cm². Sample No 7, fragment-1. | Silicon with carbon nano-tube operating surface S = 1 cm². Sample No 2 (10330) | Water h = 300 | 2<br>5<br>10<br>20<br>900<br>1800<br>3600 | 45<br>40<br>37<br>33<br>25<br>20<br>20 | 420<br>380<br>350<br>337<br>308<br>300<br>300 |
| 5 | Mono-crystal polished silicon S = 18 cm². Sample No 7, fragment-1. | Silicon with carbon nano-tube operating surface S = 1 cm². Sample No 3 (10224). | Water h = 350 | 2<br>5<br>10<br>20<br>900<br>2700<br>5400 | 60<br>50<br>41<br>35<br>22<br>20<br>20 | 310<br>300<br>289<br>277<br>238<br>250<br>250 |
| 6 | Mono-crystal polished silicon S = 18 cm². Sample No 7, fragment-1. | Silicon with carbon nano-tube operating surface S = 0.5 cm². Sample No 4 (10125). | Water h = 300 | 2<br>5<br>10<br>20<br>900<br>2700<br>5400 | 60<br>47<br>36<br>25<br>16<br>10<br>10 | 490<br>430<br>355<br>300<br>238<br>120<br>120 |

TABLE 3

Operating currents and voltage of the screened cells of the water-containing membranes with electrodes of polished glass carbon GC-2000, glass carbon with the micro-non-uniform surface and glass carbon, covered with a thin film of carbon nano-tubes, nano-porous silicon and mono-crystal silicon covered with a thin film of dioxide vanadium nano-structures.

| No | Bottom electrode | Top electrode | Filler. Layer's thickness, h, micron | Time, s | $U_{output}$, mV | $I_{output}$, nA |
|---|---|---|---|---|---|---|
| 7 | Polished glass carbon GC-2000, S = 20 cm². Sample No 1, fragment-1. | Silicon EKSE 0.1 nano-porous, S = 2.5 cm². Sample No 2. | Water h = 300 | 2<br>5<br>10<br>20<br>900<br>1800<br>3600 | 43<br>35<br>30<br>26<br>20<br>15<br>15 | 400<br>320<br>300<br>250<br>160<br>90<br>89 |

TABLE 3-continued

Operating currents and voltage of the screened cells of the water-containing membranes with electrodes of polished glass carbon GC-2000, glass carbon with the micro-non-uniform surface and glass carbon, covered with a thin film of carbon nano-tubes, nano-porous silicon and mono-crystal silicon covered with a thin film of dioxide vanadium nano-structures.

| No | Bottom electrode | Top electrode | Filler. Layer's thickness, h, micron | Time, s | $U_{output}$, mV | $I_{output}$, nA |
|---|---|---|---|---|---|---|
| 8 | Polished glass carbon GC-2000, S = 20 cm². Sample No 1, fragment-1 . . . | Glass carbon with the micro-pointed structure of the operating surface, covered with the nano-tube carbon film, S = 4 cm². Nano-tube diameter 20-50 Å. Thickness of the carbon film 0.1 micron. Nano-tube height 100-200 Å. Sample No 3 | Water h = 150 | 2<br>5<br>10<br>20<br>900<br>1800<br>3600 | 74<br>65<br>60<br>56<br>50<br>45<br>40 | 2700<br>1900<br>1800<br>1500<br>1000<br>500<br>500 |
| 9 | Polished glass carbon GC-2000, S = 20 cm². Sample No 1, fragment-1 . . . | Glass carbon with micro-heterogeneities of the order of 1-5 micron. S = 5 cm². Sample No 2, fragment-1. | Water h = 150 | 2<br>5<br>10<br>20<br>900<br>1800<br>3600 | 124<br>110<br>100<br>86<br>80<br>75<br>70 | 1100<br>850<br>750<br>640<br>600<br>400<br>370 |
| 10 | Polished glass carbon GC-2000, S = 20 cm². Sample No 1, fragment-1 . . . | Polished mono-crystal silicon with the operating surface of the dioxide vanadium film (the film thickness of $VO_2$ -100 nm), S = 2 cm². Sample No 1 | Water h = 100 | 2<br>5<br>10<br>20<br>900<br>1800<br>3600 | 63<br>60<br>55<br>50<br>48<br>43<br>43 | 1300<br>1220<br>1100<br>1000<br>1000<br>1000<br>1000 |
| 11 | Polished glass carbon GC-2000, S = 20 cm². Sample No 1, fragment-1 . . . | Polished mono-crystal silicon with the operating surface of the dioxide vanadium film (the film thickness of $VO_2$ -100 nm), S = 2 cm². Sample No 2 | Water h = 100 | 2<br>5<br>10<br>20<br>900<br>1800 | 77<br>70<br>65<br>60<br>52<br>52 | 1900<br>1700<br>1600<br>1500<br>1500<br>1500 |

TABLE 4

Operating currents and voltage of the screened cells of the water containing membranes with electrodes, micro-heterogeneities on which surface consist of dielectrics.

| No | Bottom electrode | Top electrode | Filler. Layer's thickness, h, micron | Time, s | $U_{output}$, mV | $I_{output}$, nA |
|---|---|---|---|---|---|---|
| 12 | Mono-crystal polished silicon S = 18 cm². Sample No 4, fragment-1. | Mono-crystal polished silicon S = 2 cm². Sample No 4, fragment-2. | Water h = 300 | 2<br>5<br>10<br>20<br>900<br>1800 | 6<br>5<br>4<br>2<br>1<br>1 | 3<br>3<br>2<br>2<br>1<br>1 |
| 13 | Mono-crystal polished silicon S = 18 cm². Sample No 4, fragment-1. Operating surface is covered with the thin powder layer (sample No 80) of coral calcium Alka-Main. | Mono-crystal polished silicon S = 2 cm². Sample No 4, fragment-2. | Water h = 300 | 2<br>5<br>10<br>20<br>900<br>1800 | 11<br>9<br>8<br>6<br>5<br>5 | 10<br>8<br>7<br>6<br>4<br>4 |
| 14 | Mono-crystal polished silicon S = 18 cm². Sample No 4, fragment-1. Operating surface is | Mono-crystal polished silicon S = 2 cm². Sample No 4, fragment-2. | Water h = 300 | 2<br>5<br>10<br>20<br>900<br>1800 | 9<br>7<br>6<br>4<br>3<br>3 | 9<br>8<br>7<br>6<br>4<br>4 |

TABLE 4-continued

Operating currents and voltage of the screened cells of the water containing membranes with electrodes, micro-heterogeneities on which surface consist of dielectrics.

| No | Bottom electrode | Top electrode | Filler. Layer's thickness, h, micron | Time, s | $U_{output}$, mV | $I_{output}$, nA |
|---|---|---|---|---|---|---|
| | covered with the thin layer of powder No 5 of pounded glass with the grain size of 5 micron. | | | | | |
| 15 | Mono-crystal polished silicon $S = 18\ cm^2$. Sample No 4, fragment-1. On the operating surface of 4 $cm^2$ 4 $mm^3$ of diamond powder No 5 are evenly distributed in a thin layer. | Mono-crystal polished silicon $S = 2\ cm^2$. Sample No 4, fragment-2. | Water h = 300 | 10 20 900 1800 3600 4800 | 9 8 6 4 4 4 | 16 12 8 5 5 5 |
| 16 | Mono-crystal polished silicon $S = 18\ cm^2$. Sample No 2, fragment-1. | Mono-crystal polished silicon $S = 2\ cm^2$. Sample No 2, fragment-2. | Water h = 300 | 10 30 900 2700 | 6 3 2 1 | 5 2 1 1 |
| 17 | Mono-crystal polished silicon $S = 18\ cm^2$. Sample No 4, fragment-1. On the operating surface of 4 $cm^2$ 1 $mm^3$ of diamond powder No 28 is evenly distributed in a thin layer. | Mono-crystal polished silicon $S = 2\ cm^2$. Sample No 4, fragment-2. | Water h = 200 | 10 30 900 2700 4500 | 8 6 4 3 3 | 15 11 5 3 3 |
| 18 | Mono-crystal polished silicon $S = 18\ cm^2$. Sample No 2, fragment-1. On the operating surface of 4 $cm^2$ 2 $mm^3$ of diamond powder No 5 are evenly distributed in a thin layer. | Mono-crystal polished silicon $S = 2\ cm^2$. Sample No 2, fragment-2. | Water h = 300 | 10 30 900 1800 2400 4800 | 12 9 7 4 4 4 | 20 14 7 6 6 6 |
| 19 | Mono-crystal polished silicon $S = 18\ cm^2$. Sample No 4, fragment-1. On the part of the operating surface of 4 $cm^2$ 2 $mm^3$ of corundum powder No 10 are evenly distributed in a thin layer. | Mono-crystal polished silicon $S = 2\ cm^2$. Sample No 4, fragment-2. | Water h = 300 | 10 30 900 2700 5100 8100 | 39 31 12 8 5 4 | 60 54 11 6 5 5 |
| 20 | Mono-crystal polished silicon $S = 18\ cm^2$. Sample No 4, fragment-1. On the part of the operating surface of 4 $cm^2$ 4 $mm^3$ of corundum powder No 28 are evenly distributed in a thin layer. | Mono-crystal polished silicon $S = 2\ cm^2$. Sample No 4, fragment-2. | Water h = 300 | 10 30 900 2700 5100 8100 | 48 33 17 12 10 10 | 20 18 8 5 5 5 |
| 21 | Mono-crystal polished silicon $S = 18\ cm^2$. Sample No 4, fragment-1. On the part of the | Mono-crystal polished silicon $S = 2\ cm^2$. Sample No 4, fragment-2. | Water h = 300 | 10 30 900 2700 5700 | 50 35 19 13 12 | 35 32 18 20 20 |

TABLE 4-continued

Operating currents and voltage of the screened cells of the water containing membranes with electrodes, micro-heterogeneities on which surface consist of dielectrics.

| No | Bottom electrode | Top electrode | Filler. Layer's thickness, h, micron | Time, s | $U_{output}$, mV | $I_{output}$, nA |
|---|---|---|---|---|---|---|
|  | operating surface of 4 cm$^2$ 4 mm$^3$ of corundum powder No 40 are evenly distributed in a thin layer. |  |  |  |  |  |
| 22 | Mono-crystal polished silicon S = 18 cm$^2$. Sample No 8, fragment-1. | Mono-crystal polished silicon S = 2 cm$^2$. Sample No 8, fragment-2. | Water h = 300 | 10 30 900 2700 5700 | 6 4 3 2 1 | 9 8 3 2 1 |

Note:
Powder number means the size of grains of powder in microns.
Note to table 4.
After removal of a thin layer of powder solid insoluble in water dielectric from the bottom electrode (the top and bottom electrodes are made of the same workpiece of polished silicon) and at preservation of the experiment's conditions current and voltage developed by the water membrane in loading become close to zero (Ioutput ≈1 nA Uoutput ≈1 mV).

TABLE 5

Dependence of internal resistance, operating currents and voltage of the screened water-containing membranes on the material of the layers limiting the membrane.

| No | Bottom electrode | Top electrode | Filler. Layer's thickness, h, micron | Time, s | $U_{output}$, mV | $I_{output}$, nA |
|---|---|---|---|---|---|---|
| 23 | Polished tantalum S = 20 cm$^2$. Sample No 1, fragment-1. | Polished mono-crystal silicon, S = 2.5 cm$^2$. Sample No 5, fragment-1. | Water h = 150 Ambient temperature t = 15° C. Internal resistance of the water membrane $R_{in}$ = 250 kOhm | 10 30 900 2700 5700 | 142 122 97 72 70 | 700 430 370 150 130 |
|  |  |  | $R^s_{in}$ = 416 kOhm · cm$^2$ |  |  |  |
| 24 | Polished plate of chrome 999.9, S = 18 cm$^2$. Sample No 1, fragment-1. | Polished plate of chrome 999.9, S = 3 cm$^2$. Sample No 1, fragment-2. Internal resistance of the water membrane $R_{in}$ = 2.1 MOhm | Water h = 100 Ambient temperature t = 15° C. $R^s_{in}$ = 6300 kOhm · cm$^2$ | 10 30 900 2700 5700 | 92 85 77 78 74 | 205 150 60 60 60 |
| 25 | Polished plate of chrome, S = 18 cm$^2$. Sample No 1, fragment-1. | Rough plate of chrome 999.9, with the grain size of 3-5 micron, S = 3 cm$^2$. Sample No 2. Internal resistance of the water membrane $R_{in}$ = 1.9 MOhm | Water h = 100 Ambient temperature t = 15° C. $R^s_{in}$ = 5700 kOhm · cm$^2$ | 10 30 900 2700 5700 | 100 105 110 98 94 | 350 300 180 100 70 |
| 26 | Polished plate of gold 99.9999, S = 12 cm$^2$. Sample No 1. | Rough plate of gold 99.9999, with the grain size of 5-7 micron, S = 3 cm$^2$. Sample No 2. Internal resistance of the water membrane $R_{in}$ = 2.4 kOhm | Water h = 150 Ambient temperature t = 15° C. $R^s_{in}$ = 4.8 kOhm · cm$^2$ | 10 30 900 2700 5700 | 64 56 52 48 44 | 400 300 200 150 150 |

Note:
Internal resistance Rs in. [kOhm · cm$^2$] is reduced to thickness of the water layer of 100 micron for the stable regime.

TABLE 6

Dependence of internal resistance, currents and voltage of the screened water containing membranes on time and the material of electrodes at the same degree of heterogeneity of the surface of the bottom and top electrodes.

| No | Bottom electrode | Top electrode | Filler. Layer's thickness, h, micron | Time, s | $U_{output}$, mV | $I_{output}$, nA |
|---|---|---|---|---|---|---|
| 27 | Polished mono-crystal silicon with the operating surface of the dioxide vanadium film (layer's thickness $VO_2$ 100 nm), $S = 1$ cm$^2$. Sample No 1, fragment-1. | Polished mono-crystal silicon with the operating surface of the dioxide vanadium film (layer's thickness $VO_2$ 100 nm), $S = 1$ cm$^2$. Sample No 1, fragment-2. | Water h = 200 Ambient temperature t = 18° C. Internal resistance $R_{in}$ = 55 kOhm. | 10 30 900 2700 5700 6600 | 300 220 154 93 37 37 | 4000 3100 1200 970 300 280 |
| 28 | Polished mono-crystal silicon with the operating surface of the dioxide vanadium film (layer's thickness $VO_2$ 100 nm), $S = 1$ cm$^2$. Sample No 2, fragment-1. | Polished mono-crystal silicon with the operating surface of the dioxide vanadium film (layer's thickness $VO_2$ 100 nm), $S = 1$ cm$^2$. Sample No 2, fragment-2. | Water h = 200 Ambient temperature t = 18° C. Internal resistance $R_{in}$ = 65 kOhm. | 10 30 900 2700 5700 6600 | 260 200 112 63 30 29 | 3500 2400 1000 820 250 235 |
| 29 | Polished glass carbon GC-2000, $S = 20$ cm$^2$. Sample No 1, fragment-1. | Glass carbon with micro heterogeneities of the order of 1-5 micron. $S = 2.5$ cm$^2$. Sample No 2, fragment-2. | Water h = 200 Ambient temperature t = 18° C. Internal resistance $R_{in}$ = 125 kOhm | 10 30 900 2700 5700 6600 | 480 310 200 180 160 157 | 2700 2050 1550 1340 1000 990 |
| 30 | Glass carbon with micro heterogeneities of the order of 1-5 micron. $S = 5$ cm$^2$. Sample No 2, fragment-1. | Glass carbon with micro heterogeneities of the order of 1-5 micron. $S = 1$ cm$^2$. Sample No 2, fragment-2. | Water h = 200 Ambient temperature t = 18° C. Internal resistance $R_{in}$ = 30 kOhm | 10 30 900 2700 5700 6600 | 560 500 460 400 350 350 | 17000 15000 12050 9040 6000 6000 |

Note:
Internal resistance Rin. [kOhm] for thickness of the water layer of 200 micron in the stable regime.

TABLE 7

Dependence of internal resistance, currents and voltage of the screened water-containing membranes on time.

| No | Bottom electrode | Top electrode | Filler. Layer's thickness, h, micron | $R^s_{in}$, kOhm·cm$^2$ | Time, s | $U_{output}$, mV | $I_{output}$, nA |
|---|---|---|---|---|---|---|---|
| 31 | Polished mono-crystal silicon, $S = 18$ cm$^2$. Sample No 7, fragment-1. | Polished mono-crystal silicon, $S = 4$ CM$^2$. Sample No 7, fragment-2. | Water h = 300 | 2200 3000 3500 4300 5100 | 10 20 900 1800 3600 | 3 1 0 0 0 | 1 0 0 0 0 |
| 32 | Polished mono-crystal silicon, $S = 18$ cm$^2$. Sample No 7, fragment-1. | Nano-porous silicon $S = 2$ CM$^2$. Sample No 1. | Water h = 300 | 400 520 647 788 1686 1800 | 2 5 10 20 900 1800 | 70 50 40 35 30 30 | 195 134 106 84 62 61 |
| 33 | Polished mono-crystal silicon, $S = 18$ cm$^2$. Sample No 7, fragment-1 | Silicon with the carbon nano-tube operating surface $S = 1$ cm$^2$. Sample No 1 (1014). | Water h = 300 | 100 145 187 237 289 300 300 | 2 5 10 20 900 1800 3600 | 54 48 44 40 30 23 23 | 320 250 200 187 150 100 25 |
| 34 | Polished mono-crystal silicon, $S = 18$ cm$^2$. Sample No 7, fragment-1. | Silicon with the carbon nano-tube operating surface $S = 0.5$ cm$^2$. Sample No 4 (10125). | Water h = 300 | 100 140 180 200 250 250 250 | 2 5 10 20 900 2700 5400 | 60 47 36 25 16 10 10 | 490 430 355 300 238 120 120 |

TABLE 7-continued

Dependence of internal resistance, currents and voltage of the screened water-containing membranes on time.

| No | Bottom electrode | Top electrode | Filler. Layer's thickness, h, micron | $R^s_{in.}$, kOhm·cm$^2$ | Time, s | $U_{output}$, mV | $I_{output}$, nA |
|---|---|---|---|---|---|---|---|
| 35 | Polished glass carbon GC-2000, S = 20 cm$^2$. Sample No 1, fragment-1. | Nano-porous silicon EKSE 0.1, S = 2.5 cm$^2$ Sample No 4. | Water h = 300 | 100 | 2 | 43 | 400 |
|  |  |  |  | 123 | 5 | 35 | 320 |
|  |  |  |  | 149 | 10 | 30 | 300 |
|  |  |  |  | 210 | 20 | 26 | 250 |
|  |  |  |  | 218 | 900 | 20 | 160 |
|  |  |  |  | 246 | 1800 | 15 | 90 |
|  |  |  |  | 250 | 3600 | 15 | 89 |
| 36 | Polished glass carbon GC-2000, S = 20 cm$^2$. Sample No 1, fragment-1. | Polished mono-crystal silicon with the operating surface of the dioxide vanadium film (layer's thickness VO$_2$ 100 nm), S = 2 cm$^2$. Sample No 1 | Water h = 300 | 10 | 2 | 63 | 1500 |
|  |  |  |  | 12 | 5 | 60 | 1220 |
|  |  |  |  | 15 | 10 | 55 | 1100 |
|  |  |  |  | 22 | 20 | 50 | 1000 |
|  |  |  |  | 38 | 900 | 48 | 1000 |
|  |  |  |  | 49 | 1800 | 43 | 1000 |
|  |  |  |  | 50 | 3600 | 43 | 1000 |
| 37 | Polished glass carbon GC-2000, S = 20 cm$^2$. Sample No 1, fragment-1. | Glass carbon with the micro-pointed structure of the operating surface, covered with the nano-tube carbon film, S = 4 cm$^2$. Nano-tube diameter 20-50 Å. Thickness of the carbon film 0.1 micron. Nano-tube height 100-200 Å. Sample No 3. | Water h = 300 | 3 | 2 | 74 | 2700 |
|  |  |  |  | 9 | 5 | 65 | 1900 |
|  |  |  |  | 42 | 10 | 60 | 1800 |
|  |  |  |  | 75 | 20 | 56 | 1500 |
|  |  |  |  | 81 | 900 | 50 | 1000 |
|  |  |  |  | 87 | 1800 | 45 | 500 |
|  |  |  |  | 90 | 3600 | 40 | 500 |
| 38 | Polished glass carbon GC-2000, S = 20 cm$^2$. Sample No 1, fragment-1. | Glass carbon with micro heterogeneities of the order of 1-5 micron. S = 4 cm$^2$. Sample No 2, fragment-1. | Water h = 300 | 3 | 2 | 124 | 1100 |
|  |  |  |  | 12 | 5 | 110 | 850 |
|  |  |  |  | 56 | 10 | 100 | 750 |
|  |  |  |  | 72 | 20 | 86 | 640 |
|  |  |  |  | 108 | 900 | 80 | 600 |
|  |  |  |  | 117 | 1800 | 75 | 400 |
|  |  |  |  | 120 | 3600 | 70 | 370 |

Note:
Internal resistance Rs in. [kOhm·cm$^2$] is reduced to thickness of the water layer - 300 micron and area of 1 cm$^2$.

The invention claimed is:

1. A method for producing electric power comprising the steps of:
    providing at least two conductive layers capable of conducting electric current, produced of material inert in relation to water, said layers including structural nano-dimensional heterogeneities with dimensions limited in a predetermined nano-meter range, said conductive layers connected substantially to an external electric load;
    providing a predetermined water-containing layer disposed between said conductive layers, so that said conductive layers surrounding and being in contact with said water-containing layer; and
    releasing electric power in said external electric load.

2. The method according to claim 1, wherein
    said nano-dimensional heterogeneities being provided in the form of ledges and/or hollows and/or nano-dimensional parametrical heterogeneities.

3. The method according to claim 2, wherein
    the material of said conductive layers being provided in the form of dielectric or semiconductor with conductive inclusions, and the inclusions are connected to one common electric bus substantially connected to said external electric load.

4. The method according to claim 1, wherein
    the material of said conductive layers being provided in the form of dielectric or semiconductor with conductive inclusions, and the inclusions are connected to one common electric bus substantially connected to said external electric load.

5. The method according to claim 1, wherein
    said water-containing layer including chemical and/or mechanical impurities at a concentration of not more than 1%.

6. A source of electric power comprising at least one isolated cell or membrane, said cell including:
    at least two conductive layers capable of conducting electric current, produced of material, inert in relation to water, said layers including structural nano-dimensional heterogeneities with dimensions limited in a predetermined nano-meter range, said conductive layers connected substantially to an external electric load; and
    at least one water-containing layer having a thickness in a predetermined range, said water-containing layer being disposed between said conductive layers, so that said conductive layers surrounding and being in contact with said water-containing layer.

7. The source of electric power according to claim 6, wherein
said nano-dimensional heterogeneities being provided in the form of ledges and/or hollows and/or nano-dimensional parametrical heterogeneities.

8. The source of electric power according to claim 7, wherein
the material of said conductive layers being provided in the form of dielectric or semiconductor with conductive inclusions, and the inclusions are connected to one common electric bus substantially connected to said external electric load.

9. The source of electric power according to claim 7, wherein
said source comprising at least two isolated cells connected in series or in parallel to each other, thereby joined in one electric circuit.

10. The source of electric power according to claim 7, wherein
said water-containing layer including chemical and/or mechanical impurities at concentrations of not more than 1%.

11. The source of electric power according to claim 6, wherein
the material of said conductive layers being provided in the form of dielectric or semiconductor with conductive inclusions, and the inclusions are connected to one common electric bus substantially connected to said external electric load.

12. The source of electric power according to claim 11, wherein
said water-containing layer including chemical and/or mechanical impurities at concentrations of not more than 1%.

13. The source of electric power according to claim 6, wherein
said source comprising at least two isolated cells connected in series or in parallel to each other, thereby joined in one electric circuit.

14. The source of electric power according to claim 13, wherein
said water-containing layer including chemical and/or mechanical impurities at concentrations of not more than 1%.

15. The source of electric power according to claim 6, wherein
said water-containing layer including chemical and/or mechanical impurities at concentrations of not more than 1%.

16. The source of electric power according to claim 6, wherein
said at least two conductive layers including three conductive layers made of an insoluble in water material; and
said at least one water-containing layer including two water-containing layers disposed respectively between said three conductive layers.

17. The source of electric power according to claim 6, wherein said predetermined range of thickness constituting a single-digit number of nanometers.

* * * * *